United States Patent
Sundstrom

(10) Patent No.: US 8,668,077 B2
(45) Date of Patent: Mar. 11, 2014

(54) BELT PLOUGH

(75) Inventor: Paul Sundstrom, Gladstone (AU)

(73) Assignee: Tasman-Warajay Pty Ltd, Gladstone, Queensland (AU)

( * ) Notice: Subject to any disclaimer, the term of this patent is extended or adjusted under 35 U.S.C. 154(b) by 0 days.

(21) Appl. No.: 13/581,460

(22) PCT Filed: Mar. 10, 2011

(86) PCT No.: PCT/AU2011/000272
§ 371 (c)(1),
(2), (4) Date: Aug. 27, 2012

(87) PCT Pub. No.: WO2011/109871
PCT Pub. Date: Sep. 15, 2011

(65) Prior Publication Data
US 2012/0318642 A1    Dec. 20, 2012

(30) Foreign Application Priority Data
Mar. 10, 2010 (AU) .............................. 2010901000

(51) Int. Cl.
*B65G 45/00* (2006.01)
*B65G 21/20* (2006.01)

(52) U.S. Cl.
USPC .................................... 198/499; 198/836.3

(58) Field of Classification Search
USPC ......... 198/836.1, 836.2, 836.3, 452, 453, 499
See application file for complete search history.

(56) References Cited

U.S. PATENT DOCUMENTS

| 3,865,232 | A  | * | 2/1975 | Koenig et al. ................. 198/497 |
| 4,944,386 | A  |   | 7/1990 | Swinderman |
| 5,875,881 | A  | * | 3/1999 | Brink ............................ 198/499 |
| 6,557,697 | B1 | * | 5/2003 | Bowman .................... 198/836.3 |
| 6,575,294 | B1 | * | 6/2003 | Swinderman et al. ..... 198/836.1 |
| 7,584,835 | B2 | * | 9/2009 | Wimsatt et al. .............. 198/497 |
| 7,743,906 | B2 | * | 6/2010 | Accettura .................... 198/452 |

FOREIGN PATENT DOCUMENTS

JP    2007-210736    8/2007

OTHER PUBLICATIONS

International Search Report from related International Application No. PCT/AU2011/000272, dated Apr. 19, 2011, in 3 pages.

* cited by examiner

*Primary Examiner* — James R Bidwell
(74) *Attorney, Agent, or Firm* — Knobbe Martens Olson & Bear LLP

(57) ABSTRACT

A belt plough assembly is used to deflect material on a conveyor belt. The belt plough assembly includes a support structure, and a blade operatively positioned by the support structure on the material carrying side of the conveyor belt and orientated to deflect or redirect outlying material on a conveyor belt back inside the alignment of the skirts. The support structure includes a housing having an upright slot within which the blade is slidably mounted. The blade rests on the belt under its own weight, but is freely movable relative to the support structure. This enables the blade to maintain contact with the belt and follow any undulations in the belt, and self-adjust for wear on the blade. A damper may be provided for damping movements of the blade.

18 Claims, 3 Drawing Sheets

BELT PLOUGH

RELATED APPLICATIONS

This application is the National Stage of International Application No. PCT/AU2011/000272, filed Mar. 10, 2011, entitled IMPROVED BELT PLOUGH, which claims the benefit of Australian Application No. 2010901000, filed Mar. 10, 2010, each of which is hereby incorporated by reference in their entirety.

FIELD OF THE INVENTION

This invention relates generally to bulk materials handling, and more specifically, it is directed to an improved belt plough for a belt conveyor.

BACKGROUND ART

A conveyor belt is typically used to convey bulk material from one or more upstream loading points to a downstream discharge location. The material is normally dropped onto the moving belt at each loading point, either vertically or at an angle.

Skirting is used to contain the material while it settles down on the belt after loading. The skirting typically comprises upright barriers extending parallel to the longitudinal sides of the belt, a nominal distance in from the respective opposite edges. Each barrier is typically blade-like in shape, orientated in the direction of travel of the belt. Skirting need only be located in the vicinity of the each loading station and some distance downstream thereof.

Where there is more than one loading point on a conveyor, the material from an upstream loading point then has to enter back into a skirting arrangement at a downstream loading point. As material travels along on a conveyor it typically settles down and spreads out a bit, which means that even if material left the upstream loading station well contained with no material outside the skirting, by the time it gets to a downstream loading station there will often be a significant amount of material outside the alignment of the skirts.

There are two types of devices called 'belt ploughs', namely:

(i) belt ploughs located on the material carrying side of a conveyor belt and used to deflect or redirect the material being conveyed from one part of the belt to another, or off the belt altogether; and (ii) belt ploughs located on the non material-carrying side (or return strand) of a conveyor belt to deflect or scrape off larger foreign objects that may get onto the belt, and could cause serious damage if they entered the nip point of a pulley. This invention is directed to belt ploughs of the first type, and references herein to 'belt ploughs' are intended to refer to carrying side belt ploughs.

Moreover, the term 'plough' is intended to mean 'plow' in those countries where the latter spelling is used.

One type of belt plough is used to deflect or redirect outlying material on the conveyor belt back inside the alignment of the skirts, to avoid colliding with the skirts and spilling from the conveyor. It is important to make the distinction between the mode of operation of the blade-like skirting on the one hand and belt ploughs on the other. The skirting blades are not designed to deflect or redirect material that is already settled on the belt (as a plough does), but to contain it from spilling to unwanted (outer parts) of the belt.

If a belt plough does not remove or recover all the material from that part of the belt laterally outside the skirting, then it typically will lead to spillage/cleanup problems downstream.

It has been found that known belt ploughs do not perform this job properly and do not avoid spillage. With known belt ploughs in fixed arrangements, the plough blade quickly wears and allows material to pass through. In some arrangements, the whole plough assembly comprising the plough frame and blade(s) can "float" or pivot, but the applied bearing pressure or bias force on the belt surface then becomes excessive, along with the wear rate of the blades. The top surface of the belt often becomes exposed to excessive wear at the same time.

Consequently, it is quite common for the skirting to be extended all the way between the loading points to avoid this spillage problem, adding significantly to the cost of construction.

Most conveyor belts have vulcanised splices joining the separate sections from which the belt is made. However, there are also quite a large number of belts in service with mechanical clips joining the sections of belt, and these clips can protrude noticeably above the surface of the belt. In addition, the surface of the belt may be damaged for other reasons, leading to surface irregularities. Such raised belt joins and other surface irregularities can interfere with the operation of known plough blades.

It is an aim of the invention to provide an improved belt plough which overcomes or ameliorates one or more of the disadvantages or problems described above, or which at least provides the consumer with a useful choice.

SUMMARY OF THE INVENTION

In one broad form, this invention provides a belt plough assembly for use with a conveyor belt, the belt plough assembly comprising: a support structure; and a blade operatively positioned by the support structure on the material carrying side of the conveyor belt and orientated to deflect or redirect material on the conveyor belt, wherein the blade is freely movable relative to the support structure, and is adapted to rest on the belt primarily or substantially under its own weight.

In another form, the invention provides a conveyor belt installation comprising a conveyor belt and a plurality of plough assemblies located adjacent opposite longitudinal edges of the belt, each plough assembly comprising a support structure; and a blade operatively positioned by the support structure on the material carrying side of a conveyor belt and orientated to deflect or redirect material on the conveyor belt, wherein the blade is freely movable relative to the support structure, and rests on the belt primarily or substantially under its own weight.

In use, the blade rests on the belt substantially under its own dead weight, i.e. without any significant externally applied positive bias or force, and is free to move up and down relative to the support structure. This enables the blade to maintain contact with the belt and follow any undulations in the belt, and self-adjust for wear on the blade.

In one embodiment, the support structure comprises a housing having an upright slot within which the blade is slidably mounted.

Advantageously, the belt plough assembly may optionally include a mechanism to enable the blade to jump obstructions on the surface of the belt, where such facility is desired in an installation. That mechanism may include an inclined floating servo link arm on the upstream side of the blade, extending downwardly and in a direction opposite to the direction of travel of the belt. The arm has a lower end portion adapted to rest on the belt and an upper end portion which operatively engages the blade. When the lower end of the arm encounters an obstruction on the belt, the impact force on the link arm is transmitted upwardly at an angle to the blade, causing the blade to lift. Once the obstruction has passed, the servo force disappears and the blade drops back onto the belt under gravity. A high-friction material can be interposed between the upper end of the link arm and the blade, to increase the frictional lift force applied to the blade.

The link arm is preferably about the same width as the blade in order to shield it from the obstructions on the belt. An additional advantage of the obstruction jumping mechanism is that, although the link arm exerts a much lower bearing pressure on the belt, the link arm still performs a pre-cleaning function before the belt reaches the blade.

In another embodiment, the blade is connected to the support structure by a pivotable arm.

Preferably, the blade is made of a suitable synthetic material. The construction of the plough assembly enables a blade made from synthetic material of specific gravity about 1.0 (which includes most plastics materials) to operate satisfactorily on a belt under the light bearing pressures created by the dead weight of a blade typically about 300 mm in height. It has been found that the wear rate of such a blade is acceptable, and the blade material does not accumulate heat from the frictional rubbing faster than it can be dissipated, i.e. the synthetic blade does not melt.

Advantageously, the plough assembly includes means for damping movements of the blade. In a preferred embodiment, a sheet of resiliently flexible rubber is attached to the blade, normally across the top of the blade and extending on both sides. The outer sections of the thin, soft rubber sheet sag or droop slightly under their own weight. Due to the inertial resistance of the outer sections to acceleration, they provide a counteracting force that dampens the vibration caused by the blade skipping along on the belt surface, thereby enabling it to maintain better contact with the belt at light bearing pressures. In this embodiment, the blade is still considered to rest on the belt substantially under its own dead weight as the sheet of resiliently flexible rubber does not add significant weight and/or can be considered to be part of the blade.

A conveyor belt installation typically comprises a plurality of plough assemblies as described above, located at outer longitudinal edge regions of the belt, either as opposed pairs or in staggered formation, and orientated to deflect material towards the centre of the belt. A series of belt plough assemblies can be installed at spaced locations longitudinally along the belt, to improve the cleaning performance of the system further.

In order that the invention may be more readily understood and put into practice, one or more preferred embodiments thereof will now be described, by way of example only, with reference to the accompanying drawings.

DETAILED DESCRIPTION OF PREFERRED EMBODIMENT(S)

Figure 1:
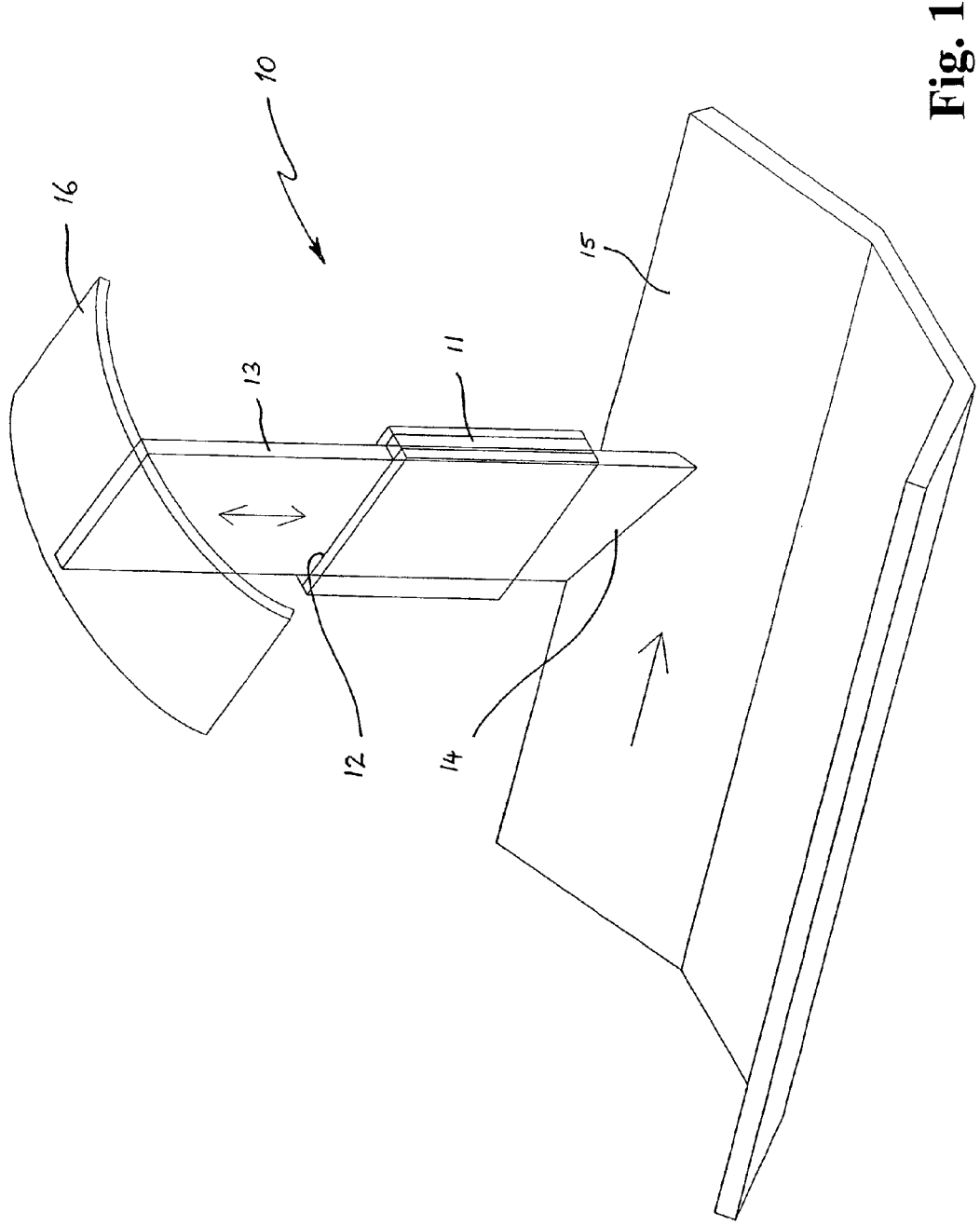
FIG. 1 is a schematic perspective view of a belt plough assembly according to one embodiment of the invention, shown in working relationship with a conveyor belt.

FIG. 1. illustrates a belt plough assembly 10 according to a first embodiment of the invention. The belt plough assembly 10 comprises a housing 11 having a slot therein which extends substantially vertically. An upright plough blade 13 is located within the slot 12, and is able to slide up and down in the slot.

Although the slot 12 is shown vertical in FIG. 1, it will be appreciated that the slot may be orientated at an angle to the vertical, and the blade 13 will slide in an oblique direction. Generally however, the slot 12 and blade 13 will be mounted in a substantially upright orientation.

The bottom edge 14 of the blade 13 rests on the surface of a conveyor belt 15, primarily or substantially under the dead weight of the blade 13. No significant additional downward bias or force is applied to the blade. The blade is held in the housing such that the broad face of the blade 13 is angled obliquely to the direction of travel of the conveyor belt 15, so as to direct or deflect material on the outer lateral edge region of the belt 15 towards the centre region of the belt. This ensures that when the material reaches a skirting blade downstream of the belt plough, the material will be on the inside of the skirting blade.

As the blade 13 is able to slide up and down in the housing 11, it can maintain contact with the belt and follow any undulations in the moving belt. Moreover, the blade can self-adjust for wear.

Typically, the blade 13 is made of a suitable synthetic material, such as a rigid lightweight hard-wearing plastics or polymer material. The blade is typically about 300 mm in height, but it is to be understood that the height of the blade can be selected to suit the particular application.

As the blade rests primarily or substantially under its own weight, it imposes a relatively light bearing pressure on the belt. To minimise unwanted vibration caused by the blade skipping along the belt surface, a damping means is provided. The damping means comprises a resiliently flexible lightweight rubber sheet 16 attached to the top of the blade 13 and extending on both sides thereof in a cantilevered manner, as shown in FIG. 1. The lightweight sheet 16 does not add substantially to the weight of the blade. The outer sections of the thin, soft rubber sheet 16 sag or droop slightly under their own weight, and tend to 'flap' slightly as the blade oscillates up and down. Due to the inertial resistance of the outer flap sections of the sheet 16 to acceleration, they provide a counteracting force that dampens the vibration caused by the blade skipping along on the belt surface, thereby enabling it to maintain more consistent contact with the belt, even at light bearing pressures.

It will be appreciated that other forms of damping mechanisms can be provided.

Typically, belt plough assemblies 10 are provided on both sides of the conveyor belt 15. They may be arranged in opposed pairs with their orientations being mirror images of each other, or the plough assemblies on one side may be staggered relative to the plough assemblies on the other side.

A series of belt plough assemblies 10 may be installed on each side of the belt, one behind the other, to provide more thorough and reliable cleaning of the belt.

Figure 2:
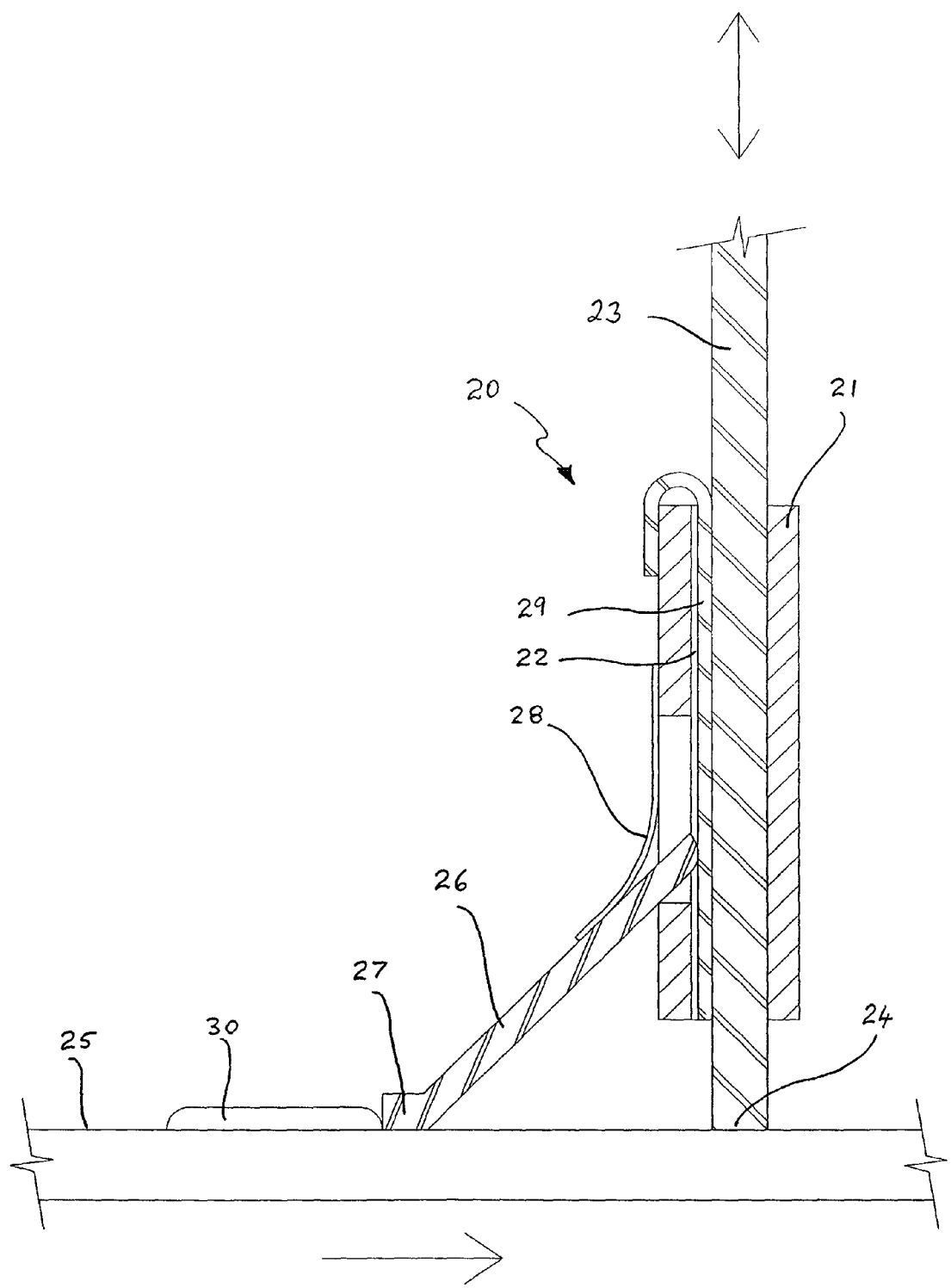
FIG. 2 is a schematic sectional elevation of a belt plough according to a second embodiment of the invention, shown in working relationship with a conveyor belt.

FIG. 2 illustrates a modified belt plough assembly according to a second embodiment of the invention. The plough assembly 20 of FIG. 2 is similar to that of FIG. 1, in that it comprises a housing 21 having a slot 22 in which a blade 23 is slideably mounted in an upright orientation. The blade 23 has a lower edge portion 24 which rests upon the moving belt 25, and is free to move up and down to follow undulations in the belt.

The belt plough assembly 20 also has a link arm 26 extending obliquely downwardly from the housing 21 and in the counter direction to the direction of travel of the belt 25, i.e. on the upstream side of the blade 23. The link arm 26 is provided with a flat-bottomed foot portion 27 which rests upon the belt 25. The link arm 26 is connected to the housing 22 by a flexible strap 28 or other suitable hinge, so that the foot 27 of the link arm can 'float' on the surface of the belt 25.

A sheet of high friction material 29 is interposed between the upstream end of the blade 23 and the housing 21, as illustrated in FIG. 2. The upper end of the link arm 26 abuts the sheet of high friction material.

In use, if the foot 27 of the link arm 26 encounters an obstruction 30 on the belt, the impact force of the obstruction against the foot 27 will cause the link arm to push against the sheet 29, and in turn, the sheet 29 will be pushed against the blade 23. Due to the angled orientation of the link arm, the force on the link arm will lift the blade in the housing, so that the lower edge 24 of the blade will be raised clear of the obstruction 30 as it passes below it. The link arm mechanism thereby protects the blade 23 from obstructions on the belt 25.

To ensure that the link arm 26 detects all obstructions which may impact the blade, at least the foot portion 27 of the link arm should have a lateral or transverse dimension at least as wide as the width of the blade 23. Therefore, another advantage of the wide foot 26 is that it performs a pre-cleaning function before the material on the belt reaches the blade, thereby improving the overall performance.

Figure 3:
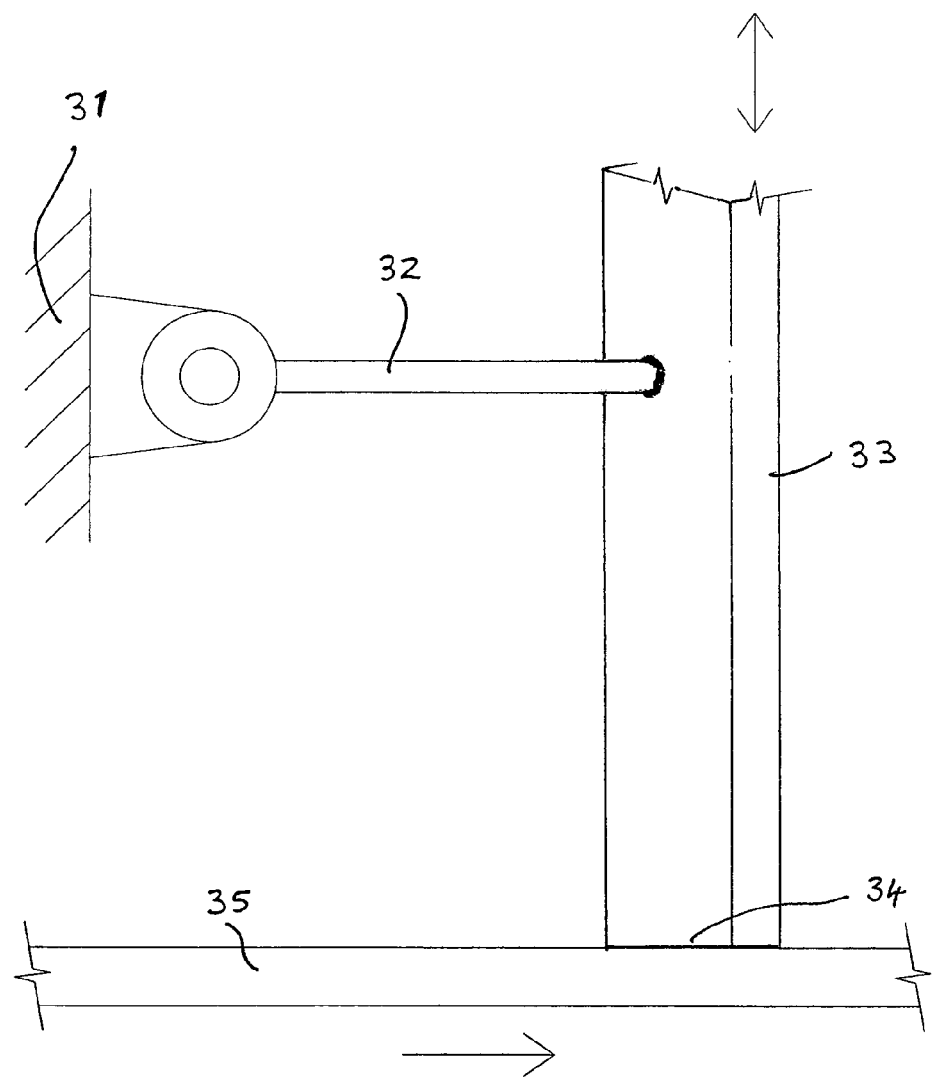
FIG. 3 is a schematic elevation of a belt plough according to a third embodiment of the invention, shown in working relationship with a conveyor belt.

FIG. 3 illustrates a third embodiment of the plough assembly in which a blade 33 is pivotally connected to a support 31 by a pivot arm 32. The support 31 may be part of the conveyor supporting framework. The pivot arm 32 is of relatively lightweight construction. The bottom edge 34 of the blade 33 rests on the belt 35. The blade 33 is able to pivot freely about its pivot connection to the support 31 so that it rests substantially under its own weight on the belt, and can maintain contact with the belt and follow any undulations in the moving belt. A damping mechanism as described above may be added to blade 33 or pivot arm 32.

As with the previous embodiments, the belt plough of FIG. 3 can use a blade of "ordinary" plastic/rubber which can operate primarily under its own weight without excessive wear rates or melting, and still provide a satisfactory cleaning performance.

The foregoing embodiments are illustrative only of the principles of the invention, and various modifications and changes will readily occur to those skilled in the art. The invention is capable of being practiced and carried out in various ways and in other embodiments. It is also to be understood that the terminology employed herein is for the purpose of description and should not be regarded as limiting.

The term "comprise" and variants of that term such as "comprises" or "comprising" are used herein to denote the inclusion of a stated integer or integers but not to exclude any other integer or any other integers, unless in the context or usage an exclusive interpretation of the term is required.

What is claimed is:

1. A belt plough assembly for use with a conveyor belt, the belt plough assembly comprising:
    a support structure including a housing having an upright slot; and
    a blade operatively slidably mounted in the upright slot on the material carrying side of the conveyor belt and orientated obliquely to direction of travel of the conveyor belt to deflect or redirect material on the conveyor belt,
    wherein the blade is freely movable relative to the support structure, and is adapted to rest on the belt primarily or substantially under its own weight,
    further comprising an inclined arm on the upstream side of the blade operatively extending in a direction opposite to the direction of travel of the belt, the arm having a lower end portion adapted to rest on the belt and an upper end portion which operatively engages the blade, whereby a substantial impact on the lower end portion of the arm caused by material travelling on the belt causes the upper end portion to raise the blade off the belt.

2. A belt plough assembly as claimed in claim 1, further comprising a layer of high friction material interposed between the upper end portion of the arm and the blade.

3. A belt plough assembly as claimed in claim 1, wherein the blade is connected to the support structure by a pivotable arm.

4. A belt plough assembly as claimed in claim 1, wherein the blade is made of a synthetic material.

5. A belt plough assembly as claimed in claim 4, wherein the synthetic material is a rigid plastics material.

6. A belt plough assembly as claimed in claim 5, wherein the blade is approximately 300 mm in height.

7. A belt plough assembly as claimed in claim 1, further comprising for a damper for damping movements of the blade.

8. A belt plough assembly as claimed in claim 7, wherein the damper comprises a resilient sheet of material connected to the blade and extending laterally of the blade in a cantilevered manner.

9. A conveyor belt installation comprising
    a conveyor belt; and
    a plurality of plough assemblies located adjacent opposite longitudinal edges of the belt, each plough assembly comprising
    a support structure; and
    a blade operatively positioned by the support structure on the material carrying side of a conveyor belt and orientated obliquely to direction of travel of the conveyor belt to deflect or redirect material on the conveyor belt towards the centre region of the belt,
    wherein the blade is freely movable relative to the support structure, and is adapted to rest on the belt primarily or substantially under its own weight.

10. A conveyor belt installation as claimed in claim 9 having a plurality of said belt plough assemblies spaced apart in the direction of travel of the conveyor belt.

11. A conveyor belt installation as claimed in claim 9, wherein the support structure of each said plough assembly comprises a housing having an upright slot within which its respective blade is slidably mounted.

12. A conveyor belt installation as claimed in claim 9, further comprising for a damper for damping movements of the blade.

13. A conveyor belt installation as claimed in claim 9, wherein each said blade is made of a rigid lightweight plastics material.

14. A conveyor having
    a conveyor belt having a strand adapted to convey material in use; and
    at least one belt plough assembly comprising a blade freely movable in a vertical direction,
    wherein the blade is operatively positioned on the material carrying surface of the strand adjacent a side portion of the conveyor belt, and is orientated obliquely to the direction of travel of the conveyor belt to thereby deflect or redirect material on the strand from the side thereof towards a middle portion thereof, and wherein the blade rests on the belt primarily or substantially under its own weight.

15. A conveyor as claimed in claim 14, wherein the blade consists of a single upright planar member made of rigid plastics material.

16. A conveyor as claimed in claim 14, further comprising for a damper for damping movements of the blade.

17. A conveyor as claimed in claim 16, wherein the damper comprises a resilient sheet of material mounted to an upper portion of the blade and extending laterally of the blade in a cantilevered manner.

18. A conveyor as claimed in claim 14 comprising a plurality of said belt plough assemblies spaced along the conveyor belt, and located adjacent opposite longitudinal edges of the belt.

* * * * *

UNITED STATES PATENT AND TRADEMARK OFFICE
CERTIFICATE OF CORRECTION

Page 1 of 1

PATENT NO. : 8,668,077 B2
APPLICATION NO. : 13/581460
DATED : March 11, 2014
INVENTOR(S) : Sundstrom It is certified that error appears in the above-identified patent and that said Letters Patent is hereby corrected as shown below:

In the Specification

In column 3 at line 14, Change "obstruction jumping" to --obstruction-jumping--.

In the Claims

In column 6 at line 60, In Claim 16, change "having" to --comprising:--.

Signed and Sealed this
Twelfth Day of August, 2014

Michelle K. Lee
*Deputy Director of the United States Patent and Trademark Office*